United States Patent [19]

Brown et al.

[11] 4,260,850

[45] Apr. 7, 1981

[54] BOX FOR ENCASING AN ELECTRICAL DEVICE

[75] Inventors: Donald R. Brown, Downers Grove; Otto T. Masopust, Jr., Cicero; John R. Meal, Naperville, all of Ill.

[73] Assignee: Western Electric Company, Inc., New York, N.Y.

[21] Appl. No.: 123,603

[22] Filed: Feb. 22, 1980

Related U.S. Application Data

[62] Division of Ser. No. 16,045, Feb. 28, 1979, Pat. No. 4,221,034.

[51] Int. Cl.³ .............................................. H05K 5/02
[52] U.S. Cl. .............................. 174/52 R; 174/52 PE; 174/65 R; 220/4 E; 361/309
[58] Field of Search .............. 174/52 R, 52 PE, 65 R; 220/4 E, 4 B; 361/308, 309, 272

[56] References Cited

U.S. PATENT DOCUMENTS

| | | |
|---|---|---|
| 2,704,880 | 3/1955 | Brennan . |
| 3,092,253 | 6/1963 | Senger . |
| 3,145,448 | 8/1964 | Cotton . |
| 3,221,089 | 11/1965 | Cotton . |
| 3,289,270 | 12/1966 | Rayburn et al. . |
| 3,292,233 | 12/1966 | Black, Jr. et al. . |
| 3,303,550 | 2/1967 | Banzhof, Jr. . |
| 3,364,401 | 1/1968 | Rayburn . |
| 4,049,357 | 9/1977 | Hamisch, Jr. .................... 220/4 E X |
| 4,174,485 | 11/1979 | Soden et al. .................... 220/4 B X |

FOREIGN PATENT DOCUMENTS 2233809  7/1972  Fed. Rep. of Germany ........... 361/272

*Primary Examiner*—B. A. Reynolds
*Assistant Examiner*—D. A. Tone
*Attorney, Agent, or Firm*—R. P. Miller

[57] ABSTRACT

A rolled metallized film capacitor is encased between a pair of box halves (13 and 13') each having a pair of dovetailed slots (36 and 37) formed in opposite walls so that when the box halves are assembled about a capacitor blank (10) the slots in the respective box halves are aligned with each other. The box halves are mounted in abutting relation about a pair of parallel wires (11 and 12), and then heat fusible metal (46 and 47) is deposited in the aligned slots to lock the box halves together while bonding the wires (11 and 12) to opposite ends of the capacitor blank (10). When assembled, the boxed capacitor with the laterally extending leads may be readily machine inserted or otherwise assembled in a circuit module, such as a printed circuit board.

4 Claims, 4 Drawing Figures

BOX FOR ENCASING AN ELECTRICAL DEVICE

This is a division of application Ser. No. 16,045 filed Feb. 28, 1979 now U.S. Pat. No. 4,221,034.

FIELD OF THE INVENTION

This invention relates to a packaged electrical device and a method of fabrication, and more particularly to a boxed metallized film capacitor having heat fusible end electrodes which are utilized to secure the capacitor to terminal leads while also functioning to lock together a pair of box halves to encase the capacitor.

BACKGROUND OF THE INVENTION

Recent design criteria for circuit boards and modules require the utilization of varied types of electrical components and devices which are boxed or encased so as to be readily machine assembled or insertable into the circuit boards and modules. One type of machine insertable electrical device known as DIP's (Dual In-Line Packages) has received wide acceptance. Rolled metallized film capacitors of a type, such as shown in co-pending application Ser. No. 974,182 filed Dec. 28, 1978, in the names of W. J. Fanning and O. T. Masopust, Jr., may be DIP packaged in accordance with the disclosure in co-pending application Ser. No. 974,209, filed Dec. 28, 1978, in the name of J. R. Meal.

The present application is concerned with a unique configuration of a boxed rolled metallized film capacitor or other electrical component as well as a novel method of mass producing boxed capacitors which are readily adaptable to machine insertion.

A number of diverse manufacturing processes and apparatuses have been developed to mass process wound capacitor blanks into discrete terminated capacitor units. In U.S. Pat. No. 3,145,448 to J. H. Cotton, there is disclosed a fabrication method wherein wound foil-type capacitors are spatially secured in a ladder-like fashion between a pair of parallel wires. This ladder-like assembly is advanced incrementally to move the capacitor blanks through a series of work function stations where the wires are severed adjacent to one side of each capacitor blank, and then a slotted plastic sleeve is placed over each capacitor blank. Next, mold sections are moved about each severed capacitor and molding material is injected into the mold to merge with the sleeve to encapsulate the capacitor which is thereafter ejected from the mold.

U.S. Pat. Nos. 3,289,270 to C. C. Rayburn et al. and 3,292,233 to J. G. Black et al. also show methods and apparatus for fabricating wound capacitors wherein the capacitor blanks are spatially secured along parallel wires, which are eventually severed to form discrete capacitors with laterally extending terminal leads. U.S. Pat. No. 3,092,253 to R. J. Senger discloses apparatus for checking electrical characteristics of a string of discrete electrical components having axially extending leads captivated on a pair of parallel carrier tapes. As a result of the electrical checking operation those components found to be beyond an acceptable range of values are severed from the string.

SUMMARY OF THE INVENTION

This invention contemplates, among other things, a boxed or encased electrical device which is fabricated by placing the electrical device between a pair of box halves through which extend lead wires, and then forming conductive slugs in oppositely configured apertures formed in the respective box halves to secure the box halves together while establishing a conductive connection between the lead wires and the electrical device.

More particularly, boxed capacitors of this type may be mass produced by initially forming a first string of box halves into which are placed individual rolled metallized film capacitor blanks. A pair of parallel wires are seated in holding slots formed in the box halves. Next, a string of box halves of identical construction to the first string are overlaid on the first string so that wires are also seated in the holding slots formed in the second box halves. Each of the box halves is formed with a pair of flared slots in opposed walls so that when the boxes are mounted on the wires, the slots in respective box halves are in alignment with each other.

Following these assembly operations, a heat fusible conductive metal is sprayed into the aligned slots to form metallic slugs which at function to lock the box halves together while at the same time establishing conductive connections between the wires and the capacitor blanks. Subsequently, the boxed capacitors are wax impregnated and tested, whereafter the wires are cut adjacent to one side of each boxed capacitor to form discrete capacitors having laterally extending terminal leads. These discrete, packaged capacitors are adapted to be machine insertable into a printed circuit board.

BRIEF DESCRIPTION OF THE DRAWING

Other features and advantages of the invention will appear upon consideration of the following description of the drawings, wherein.

DETAILED DESCRIPTION

The present invention is described with respect to box packaging of an electrical device known as a rolled metallized film capacitor. Essentially, these capacitors are manufactured by winding together two thin plastic films each having one surface coated with a heat fusible metal, such as zinc or aluminum, so that the metallized surface of each film abuts the non-metallized surface of the other film. Each of the respective metallized films have one unmetallized margin or a scribe line running along one marginal edge section in the manner described in the afore-identified copending application of Fanning and Masopust.

The films are wound together in such a manner that the fully metallized margins of each film overhangs the non-metallized or scribed margin of the other film to provide terminal receiving portions on the respective films. Usually, capacitor blanks of this type are flattened and terminated by forming heat fusible metallic electrodes on opposite ends of the blank which are heat fused and bonded to the terminal portions and then securing lead wires to the electrodes. The end electrodes are customarily formed by spray depositing heat fusible metal through a mask onto the opposite terminal ends of the capacitor blank. These deposited electrodes are somewhat porous so that wax may be vacuum impregnated into the capacitor blank. Capacitors so constructed may be placed in small plastic boxes and encapsulated to produce a boxed capacitors that is readily machine insertable.

The present invention is concerned in one aspect with a unique configuration of a box for encasing or packaging electrical devices, such as rolled metallized film capacitors. The box is so configured as to assist in the assembly operations thereof. The box construction and unique method of assembly are readily adaptable to boxing other types of electrical devices, such as resistors, inductors, diodes and small circuit modules.

Figure 1:
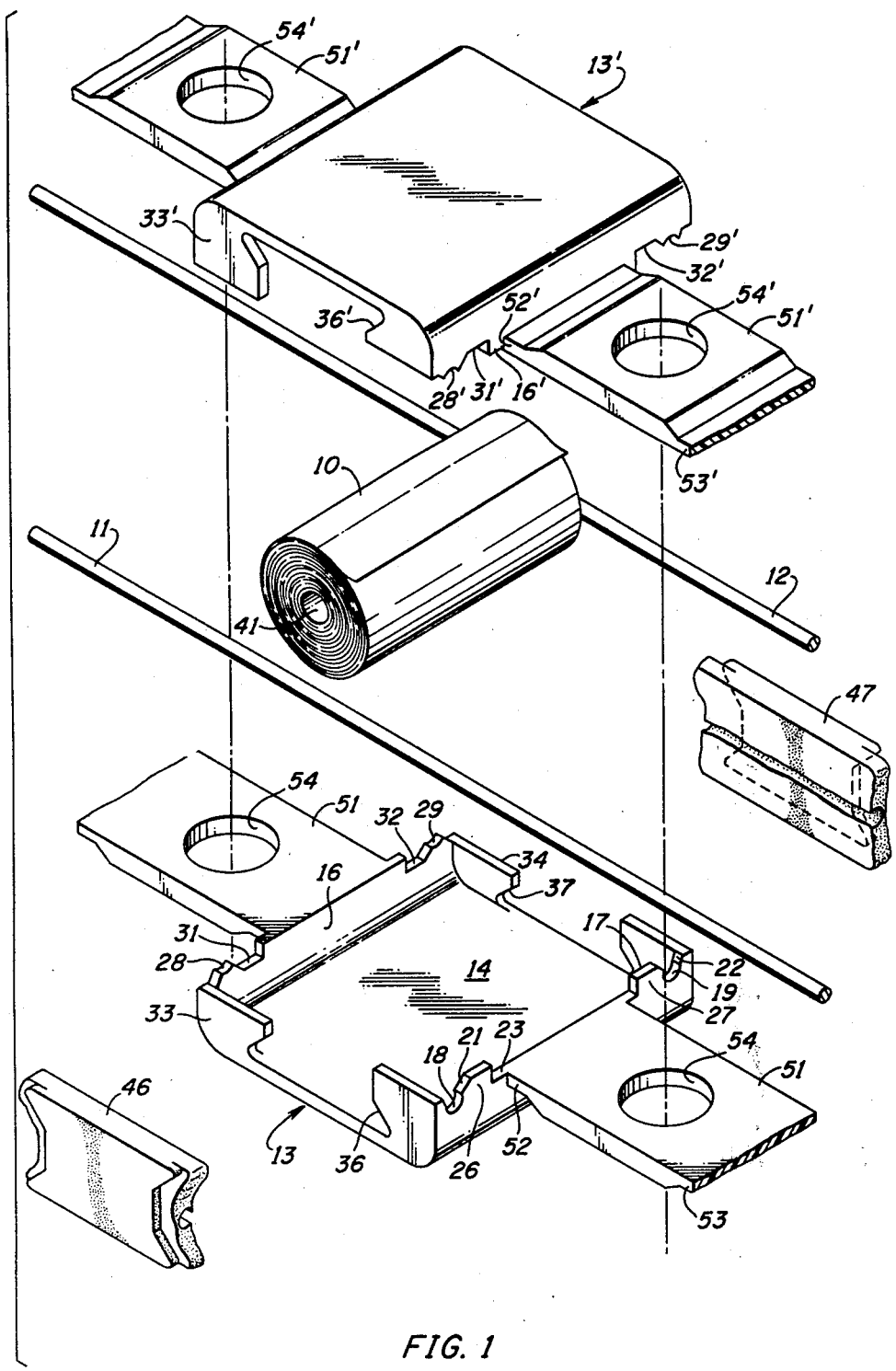
FIG. 1 is an exploded, perspective view of the component elements of a boxed rolled film capacitor constructed in accordance with the principles of the present invention.

Referring to FIG. 1, there is shown a rolled metallized film capacitor blank 10 that is to be joined to wires 11 and 12 and encased or packaged between box halves 13 and 13' which may be of identical shell-like construction. Inasmuch as the construction of each box half is identical with the other box half, prime numbers are used to identify the component portions of the box halves 13' which are identical to like portions of the box half 13. Box half 13 is molded from dielectric thermoplastic, such as polybulytene terephthalate or polyphyenylene sulfide. Boxes are formed with a bottom 14 and a pair of opposed side walls 16 and 17, such that wall 17 is higher than side wall 16. Side wall 17 is provided with a pair of circular recesses 18 and 19 that are a little larger than a semi-circle to provide neck-down entryways 21 and 22 into which lead wires 11 and 12 may be snapped and retained. An elongated slot or recess 23 is formed in side wall 17 to form a pair of projections or lugs 26 and 27.

Figure 2:
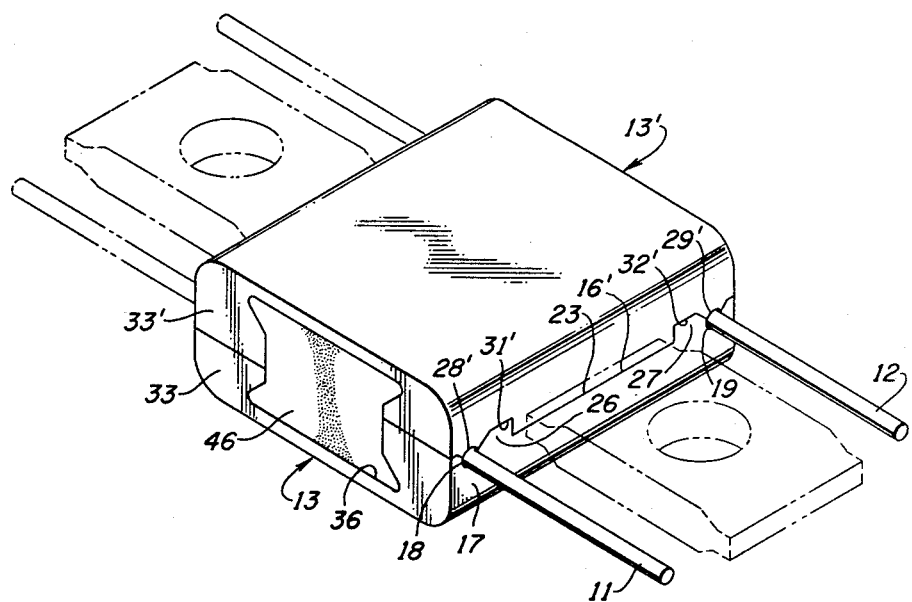
FIG. 2 is a perspective view of a discrete assembled boxed capacitor such as shown in FIG. 1.

When the box halves 13 and 13' are assembled as depicted in FIG. 2, the box half 13' is not only turned over, but is also reversed so that the projecting section of wall 16 of box half 13 is seated in the elongated slot 23' formed in side wall 17' of box half 13' and the projecting section of wall 16' is seated in elongated slot 23 to hold the box halves from lateral displacement.

The wall 16 is provided with shallow circular recesses or notches 28 and 29 which when mated with a pair of recesses 18' and 19' of a box half 13' form complete circles to captivate the wires 11 and 12. In a similar manner, recesses 18 and 19 mate with recesses 28' and 29' to form complete circles to again captivate sections of wires 11 and 12. Wall 16 is also fabricated to provide recesses 31 and 32 to receive projections 26' and 27' of the box half 13'.

There is extending downwardly from opposed end walls 33 and 34, a pair of flared or dovetailed slots 36 and 37 so that the bottoms of the slots undercut the upper edge sections of the end walls 33 and 34. It will be noted from FIG. 1 that the right-hand sections of the end walls 33 and 34, which are continuations of side wall 17, are higher than the left-hand portions of the end walls. When a box half 13' is mounted on the box half 13, the high and low portions of the side walls 33 and 34 will mate with the low and high portions of the side walls 33' and 34'.

In the assembly of a boxed capacitor, the leads 11 and 12 are snapped through the entryways 21 and 22 into the recesses 18 and 19, and other portions of these leads are positioned in the recesses 28 and 29. A capacitor blank 10 with a hollow core opening 41 is placed between the wires 11 and 12. The ends of the core opening and the terminal portions of the metallized film face the leads 11 and 12. The box half 13' is forced onto the box half 13 so that the wires 11 and 12 are snapped into the recesses 18' and 19' formed in box half 13'. The projecting sections, such as projections 26 and 27, of the respective box halves are nested within the recesses, such as recesses 31' and 32' formed in the other box half, to lock the box halves against lateral displacement. Further, during the assembly of the box half 13', pressure is applied to this box half to flatten the capacitor blank 10 so that the core opening 41 is also flattened and positioned along the horizontal midline of the box cavities in which position the flattened core opening is aligned with and in close proximity to the wires 11 and 12. With both box halves 13 and 13' snapped on the wires 11 and 12, it may be appreciated that the wires serve as a preliminary holding means for joining the box halves.

The securing of the box halves together and the joining of the wires 11 and 12 to the capacitor blank 10 is accomplished by spraying or otherwise depositing heat fusible metal in the aligned dovetailed slots so as to form metallic blocks 46 and 47. Inasmuch as the wires 11 and 12 are positioned in alignment with the flattened core opening 41, the metallic spray does not enter the core opening to short out the capacitor winding. Due to the dovetailed construction, that is the angular undercuts formed in the side walls, the solidified metal blocks function as keys to hold the box halves in firm engagement with each other. If long wires 11 and 12 extending beyond both side walls of the box halves are utilized, these wires may be trimmed to form a pair of laterally extending leads 11 and 12 as shown in FIG. 2, which leads are readily insertable in holes formed in printed circuit boards. The assembled boxed or encased capacitor as shown in FIG. 2 is readily susceptible to machine insertion.

In summary, it will be noted that the box halves are held together by the snapped in wires and the solder blocks 46 and 47. The box halves are further held from sliding movement relative to each other by the arrangement of the various seated projecting portions of the respective box halves, such as projections 26 and 27 being seated in recesses 31' and 32'.

In further processing, the assembled boxed capacitor may be placed in a vacuum chamber and impregnated with wax to provide a moisture seal. With the spray formation of the solder blocks, the resultant blocks are porous so that the wax can be forced through the blocks into the convolutions of would metallized film forming the capacitor blank. In order to drive out the air inclusions and solidify the blocks 46 and 47, the wires 11 and 12 are heated to resoften the blocks, whereupon gaseous inclusions are driven out.

The afore-described boxed capacitor is susceptible to mass assembly. In order to accomplish this, two series of boxes 13 and 13' are formed which are interconnected with tabs or webs 51 and 51'. Each tab 51 or 51' has reduced sections 52 and 53 interconnecting adjacent box halves. It will be noted that the right-hand tab joins the wall 17 at the bottom of the recess 23 which is coplanar with the juncture of the left-hand tab with the wall 16. The tabs 51 and 51' are provided with locating apertures 54 and 54'.

Figure 3:
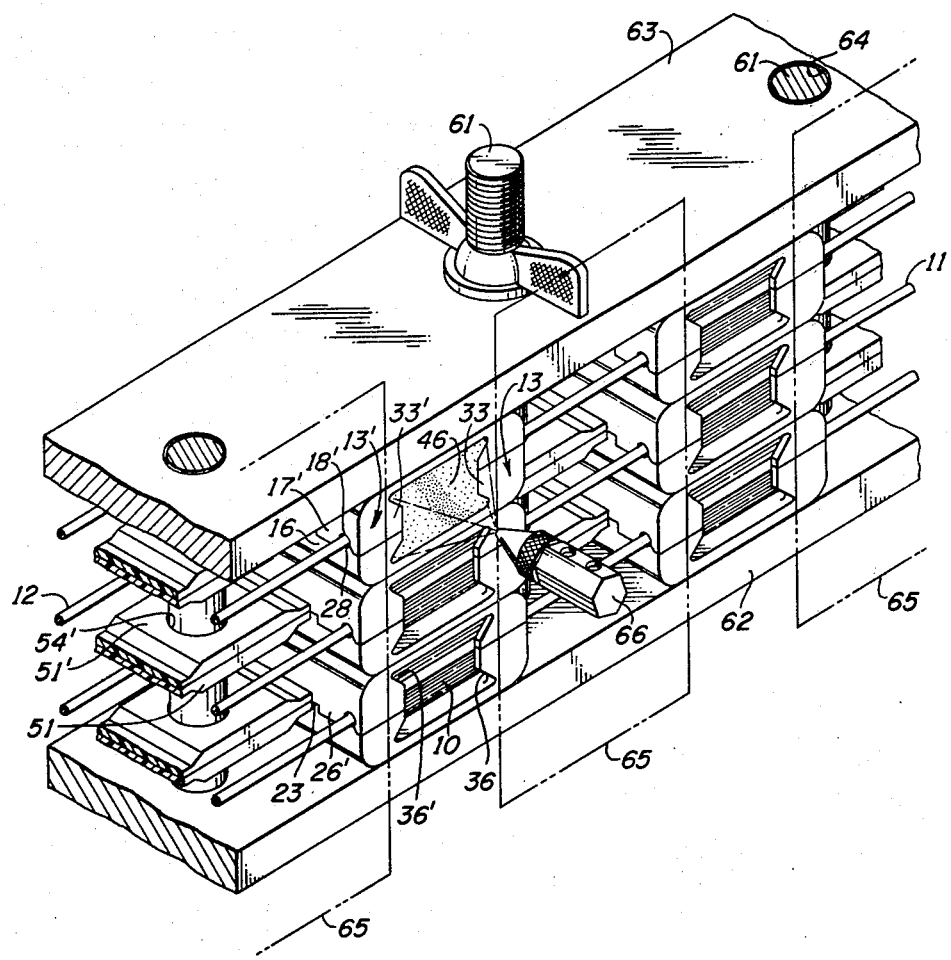
FIG. 3 is a perspective view of a racking arrangement which may be utilized to facilitate mass assembly of boxed metallized film capacitors of the type shown in FIGS. 1 and 2.

Referring to FIG. 3, there is shown a racking fixture comprising a series of vertically extending locating or racking pins or posts 61 of such size as to snugly fit within the apertures 54 and 54'. In use of the fixture shown in FIG. 3, a string of box halves 13 are rested on a base 62 for supporting locating pins 61. Long lengths of lead wires 11 and 12 are snapped into the recesses 18 and 19, and then capacitor blanks 10 are placed in each box half with the ends of the core openings 41 facing the leads 11 and 12. The leads 11 and 12 may be constructed of tinned wire such as tinned copper coated steel, tinned copper or tinned phosphor bronze. Next, a string of box halves 13' is placed over the string of box halves 13, and then another string of box halves 13 is assembled on the rack pins 61. The assembly operation proceeds as before to complete another tier of assembled lead wires, capacitor blanks and box halves. Successive tiers of boxed capacitor blanks are built up on the pins 61 and 62.

Next, a plate 63 having apertures 64 is placed over the pins 61. A force is applied to the plate 63 to compress the box halves to flatten the capacitor blanks 10 and snap the wires 11 and 12 into the recesses 18 and 19. This force may be applied by threading the upper ends of the pins and screwing wing nuts thereon to force the plate 63 downwardly to force the strings of box halves 13' against the box halves 13 to snap the lead wires 11 and 12 in the slots 18, 19, 18' and 19' while compressing and flattening the capacitor blanks 11. In the alternative, other mechanical force applying devices may be used as well as pneumatic or hydraulic force applying facilities.

A series of rectangular shields 65 is placed in front of the racks to expose the aligned pairs of dovetailed recesses 36 and 36'. The heat fusible metal, such as zinc or solder, is then sprayed by a conventional sprayer 66 into the openings to form the solder blocks 46. Shields similar to shields 65 may be placed on the other side of the racked strings of boxed capacitors to facilitate the spray forming of the solder blocks 47.

The racked boxed capacitors may be then placed in a vacuum chamber and subjected to a wax impregnation operation. Following the wax impregnation, the wires may be collectively or individually connected in a heating circuit graphically depicted by reference numerals 67 and 68 (see FIG. 4) to heat the wires and soften the solder blocks so as to drive out any gaseous inclusions. This reheating operation also acts to insure a good connection between the solder blocks and the exposed metallized edge surfaces of the rolled metallized film capacitor blank 10.

Figure 4:
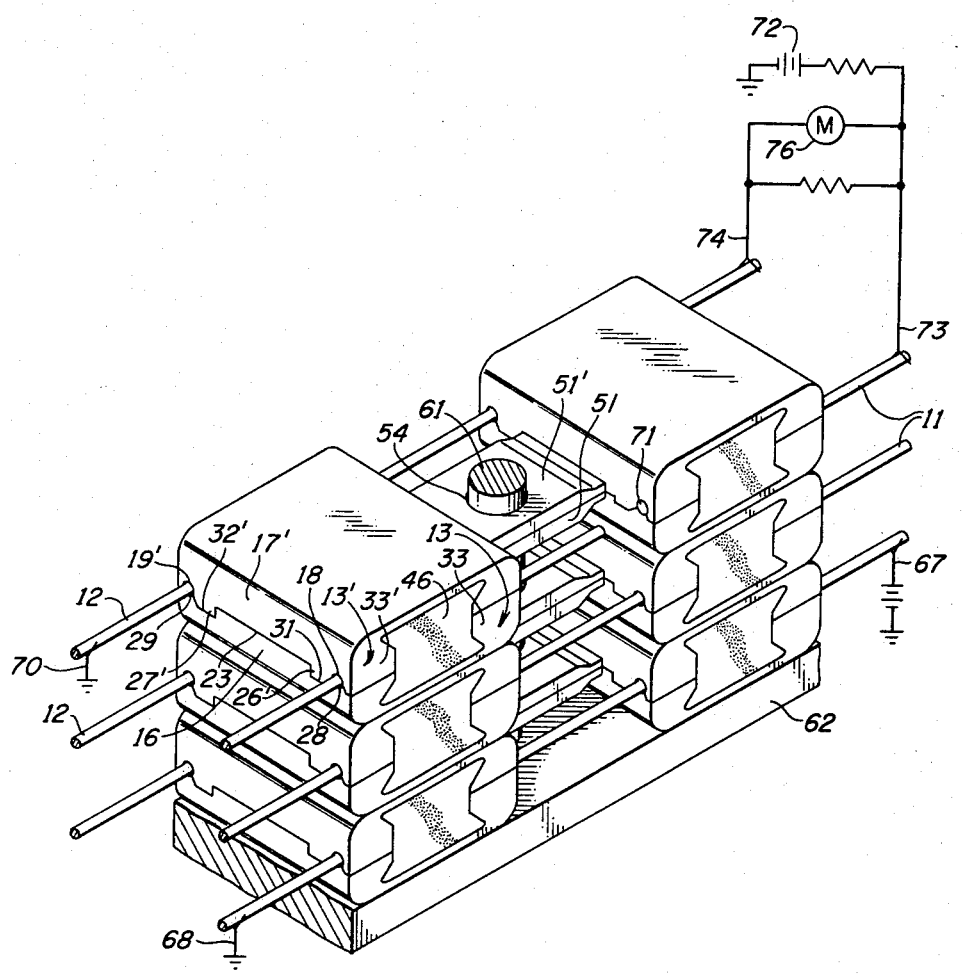
FIG. 4 is a perspective view of the racked capacitors which are sequentially connected into heating circuits and then into testing circuits.

The racked boxed capacitors, as illustrated in FIG. 4, may be individually tested in the following manner. A lead 12 associated with a tier of boxed capacitors is connected to a ground circuit depicted by reference numeral 70. The lead 11 is snipped off at the points of entry 71 to the left-hand portions of the assembled box halves. A test circuit voltage depicted by the reference numeral 72 is applied through a dual probe 73 and 74 across the right-hand unsevered extending leads 11 and 12. The ability of the boxed capacitor to hold a charge is indicated on a meter 76. If the capacitor windings are short circuited obviously the meter will depict a very low reading indicating a defective capacitor which can be marked by an identifying symbol or color. When the capacitors have been all checked, the wires 12 are clipped at the left-hand junctures with the box halves. The individual boxed capacitors are then removed from the racking pins 61, and the tabs 51 and 51' are snipped or cut from the box halves leaving boxed capacitors as shown in FIG. 2 with laterally extending leads 11 and 12. The capacitors marked defective with the identifying symbol or color may be readily segregated from the good capacitors.

What is claimed is:

1. A box for use in encasing an electrical device, which comprises:
    a pair of box halves, each having an open side and adapted to be mated with each other to form an internal cavity for receiving the electrical device; each of said box halves having a dovetailed slot formed in an end wall and extending from one open edge so as to be aligned with the dovetailed slot formed in the other box half when the box halves are mated;
    each of said box halves having a first partial circular shaped slot formed in one side wall, and a second circular slot formed in the opposed side wall, said circular slots being positioned to align with each other when the box halves are mated to form a circular opening for entry of a wire running to an electrical device positioned in said internal cavity.

2. A box for use in encasing an electrical device, as defined in claim 1, wherein
    each of said pair of box halves has a pair of dovetailed slots formed in opposed end walls, and the dovetailed slots in each box half are aligned with the dovetailed slots in the other box half when the box halves are mated.

3. A box for use in encasing an electrical device, as defined in claim 1, wherein said partial circular shaped slot formed in one side wall is greater than a semi-circle and the partial circular slot formed in the other wall is less than a semi-circle.

4. A box for use in encasing an electrical device, as defined in claim 1, wherein each first side wall of each box half is provided with a projection and the opposed second side wall is provided with a recess for receiving the projection extending from the mating box half when said box halves are mated.

* * * * *